INVENTORS
Lawrence F. Athy
Elton V. McCollum
BY
ATTORNEY

Feb. 2, 1943.  L. F. ATHY ET AL  2,309,817
METHOD OF MAKING GEOPHYSICAL EXPLORATIONS
Original Filed Aug. 2, 1937  3 Sheets-Sheet 2

INVENTORS
Lawrence F. Athy
Elton V. McCollum
BY
ATTORNEY

Feb. 2, 1943.   L. F. ATHY ET AL   2,309,817
METHOD OF MAKING GEOPHYSICAL EXPLORATIONS
Original Filed Aug. 2, 1937   3 Sheets-Sheet 3
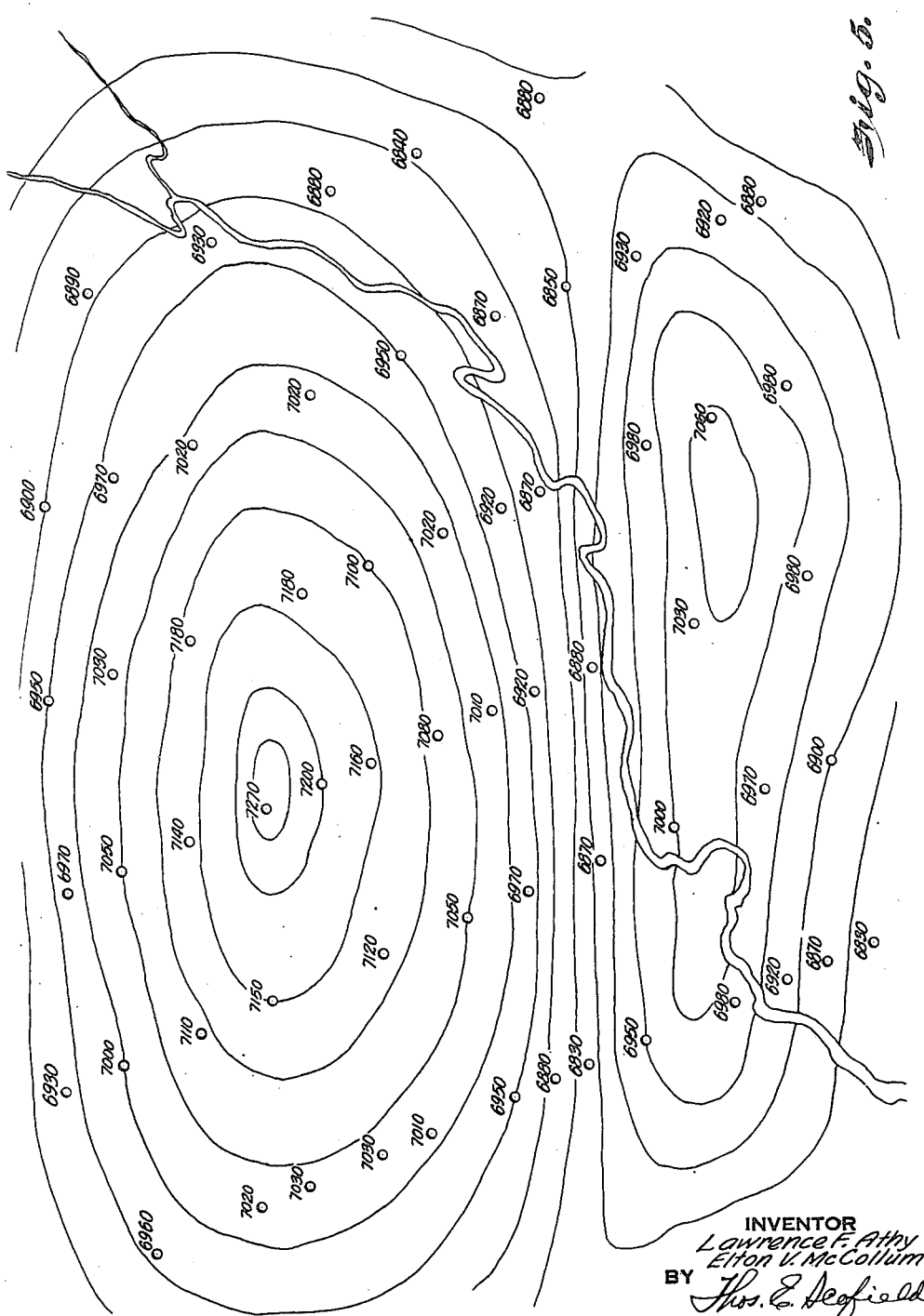
INVENTOR
Lawrence F. Athy
Elton V. McCollum
BY
ATTORNEY Patented Feb. 2, 1943

2,309,817

UNITED STATES PATENT OFFICE 2,309,817

METHOD OF MAKING GEOPHYSICAL EXPLORATIONS

Lawrence F. Athy, Ponca City, Okla., and Elton V. McCollum, Houston, Tex., assignors to Continental Oil Company, Ponca City, Okla., a corporation of Delaware Refiled for abandoned application Serial No. 156,834, August 2, 1937. This application November 12, 1940, Serial No. 365,150

7 Claims. (Cl. 181—0.5)

Our invention relates to a novel method of making geophysical explorations and more particularly to a new mode of locating geophysical structures for the purpose of discovering petroleum and other valuable mineral deposits by the use of seismic or sound waves.

This application is a refiled application of our application, Serial No. 156,834, filed August 2, 1937.

The use of seismic waves for making geophysical explorations is well known to the art. At present, the art knows of only two general modes of using seismic waves to locate structures. The basic patent relating to seismic exploration is that to Ludger Mintrop, bearing Number 1,599,538. Mintrop was a German artillery officer during the World War and sought to locate Allied artillery positions by observing the travel of seismic waves through the earth, following the firing of heavy guns. The artificial seismic waves incident to gun fire traveled through the earth and Mintrop was thus able to locate gun emplacements. He considered the seismic waves traveling horizontally through the earth and noticed that the travel times did not vary directly as a function of the distance separating shot point and receiver. It is well known in seismology that seismic waves travel through consolidated formations at speeds greater than through less consolidated formations. Normally, the deeper buried formations are the more consolidated. Seismic waves, for example, will travel more quickly through rock salt formations than through adjacent formations. Mintrop's method consisted principally in simply detonating a charge of explosive at a point and receiving the refracted seismic waves at a number of points removed from the seismic wave generation point. By observing the travel times, he is able to locate a salt dome or the like along which the seismic waves travel with a greater velocity.

The next advance in the art was made by Burton McCollum. His Reissue Patent 17,242 appears to be the basic patent for the reflection method of seismic surveying. In the reflection method of seismic surveying, the detectors are placed sufficiently close to the sound source so that seismic waves, after traveling downward through the earth, will be reflected from the hard subsurface layers and received at seismophones placed near the surface of the earth. In the reflection method of seismic surveying, it is assumed that the velocity of travel of seismic waves is a certain value. This value may be obtained by measuring the travel time of the seismic waves in well bores which have been drilled in the vicinity. The reflection method is applied for determining depth of buried structures or dip of buried structures, employing an assumed velocity of travel of seismic waves.

The instant invention proceeds upon an entirely different principle and presents a new method in applied seismology for locating structures. Instead of measuring dips and depths as is customary in reflection methods, we employ reflection methods to measure velocities in the outer portion of the earth's crust.

One object of our invention is to provide a method of locating buried geological structures by means of velocity determinations of reflected seismic or sound waves.

Another object of our invention is to provide a method of locating buried geological structures by utilizing velocity differences of reflected seismic waves in various portions of the earth's crust.

Another object of our invention is to provide a method of locating buried geological structures in which depth-velocity relations of seismic travel times are employed.

Another object of our invention is to provide a method of making geological explorations in which a novel shotpoint and receiver distribution system is used, enabling the use of velocity determinations of the transmission of seismic waves along vertical or nearly vertical paths.

In general, we create vibrations or seismic or sound waves by a charge of explosive or by other suitable means, and permit the seismic waves to travel through the subsurface formations being investigated. The waves are reflected from certain formations of proper character being investigated, and are received at predetermined points at or near the earth's surface and recorded upon record strips in order to obtain the travel time.

It is known that the velocity of seismic waves varies with physical constituency, the age and the depth of burial of geological strata. The velocity of a seismic sound wave through young sedimentary strata is normally much slower than through older strata of similar constituency. Then, too, the more deeply rock strata are buried, the greater is the speed with which they will transmit seismic or wave energy. Obviously, the speed of transmission or the velocity of seismic waves increases with depth of penetration. Likewise, it will be apparent that in most cases the velocity of transmission of seismic waves is greater over structural uplifts or anticlinal folds than over structural low areas or synclines, since rock strata of a given age and character are less deeply buried over structural uplifts.

In certain areas, the deeper lying formations may be of such character as to transmit seismic waves at a lower velocity. This is known generally from the geology of the area in which explorations are being made. In such a case, it will be obvious, of course, that the structural highs will exist over the points where the velocity of travel of seismic waves to a given time depth is slower. It will be understood, however, that this is merely a special case in the application of our method.

By observing the difference or variation in the velocity of seismic or sound waves from point to point on the earth's surface, it is possible to detect and outline the structural attitude of buried geological formations. In the seismic methods commonly practiced, the source of seismic energy and the receiving points are so positioned as to record seismic waves and their travel times in such manner and of such nature that depth to or dip slope of different reflecting formations may be determined. In our method, the shotpoint or shotpoints and receiving points are so positioned as to record seismic waves in such a manner and of such nature that their speed of travel may be calculated. In the practice of our method, we obtain a novel seismic record from which seismic velocities may be obtained. The novel record is obtained by the distribution of receiving points with respect to shotpoints. A different field operating technique to provide the time and distance variations from which velocities may be obtained is necessary.

The requisite of shotpoint and receiving point distribution to provide velocity data as distinct from that needed in reflecting dip or depth determination is that in determining velocities with accuracy the distance between the receiving points farthest from the shotpoint must be large in comparison with the distance between the shotpoint and the nearest receiving points. This distance, or overall spread, of receiving points for velocity determinations should be as great as is practical or consistent with good practice in recording reflection seismic waves and of the order of 3000 to 6000 feet. In reflection dip or depth shooting the distances are usually a few hundred, and seldom as much as 3000 feet.

Broadly, the sedimentary portion of the earth's crust consists of an alternating series of sandstones, shales, limestones and the like, similar to the annular rings of a tree. This simple plan of nature is locally disrupted at points by anomalies in both the position of the strata and their physical constituency, due to the presence of the very local structures being sought. In the conventional methods employed in the seismic art heretofore mentioned, such anomalous conditions in the physical characteristics of the earth's crust lying immediately above or adjacent to the structure being investigated induces errors which in many cases prove so serious that accurate mapping is impossible. The assumed velocities used become inaccurate due to the anomalies mentioned. Our method is not affected adversely by changing conditions intimately associated with tectonic formations but utilizes their presence as will be apparent hereinafter.

In the accompanying drawings which form part of the instant specification and are to be read in conjunction therewith, and in which like reference numerals are used to indicate like parts in the various views:

Figure 5 is a contour map of an area showing the sub-surface contours and a plurality of drill holes over the terrain with figures indicating velocity of travel of seismic waves at the particular drill holes, in feet per second.

Figure 1:
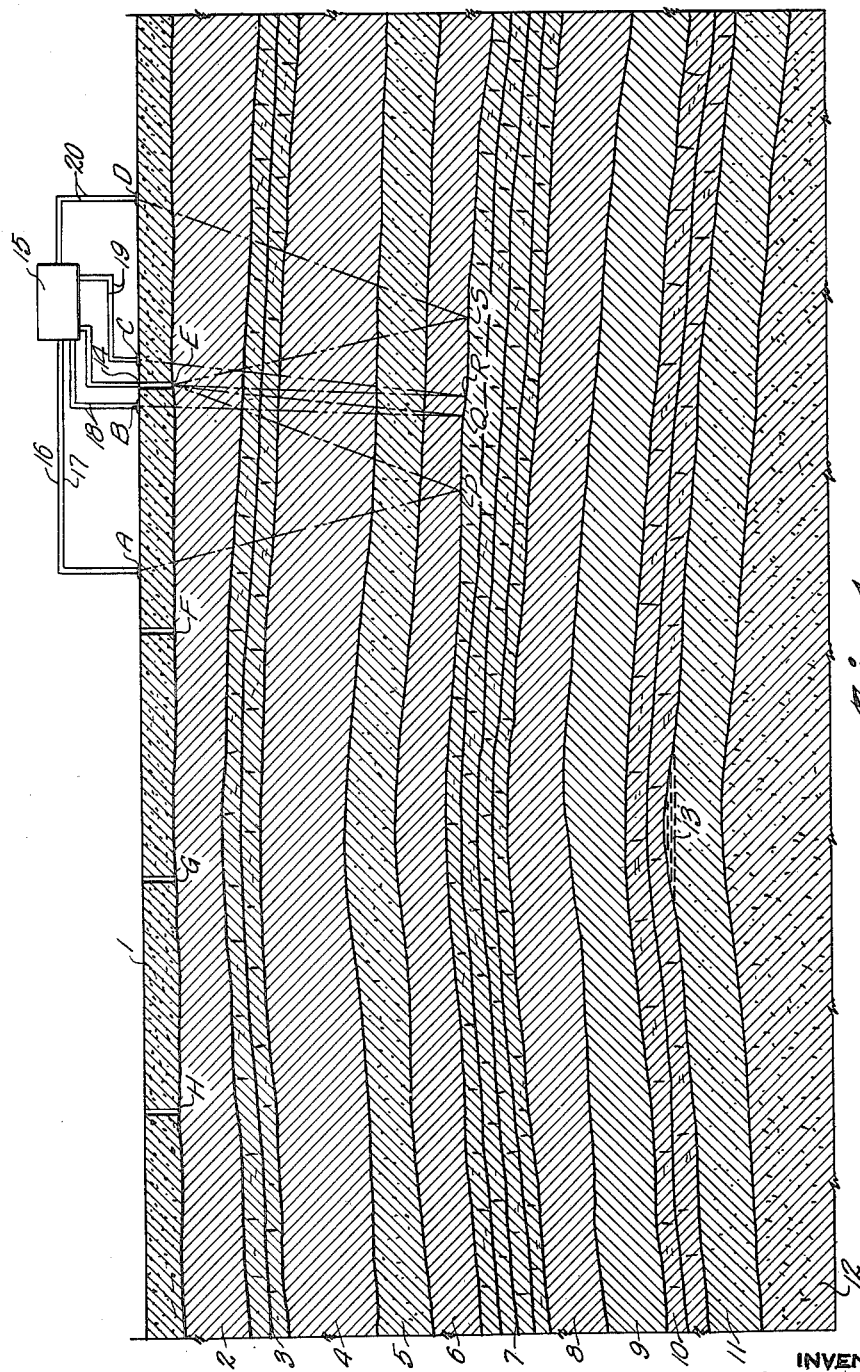
Figure 1 is a geological cross section illustrating typical beds occurring in connection with a domal or anticlinal type of structure and a diagrammatical showing of a preferred arrangement of apparatus suitable in carrying out the method of our invention.

More particularly referring now to the drawings, 1 is a weathered layer of the geological section depicted. This is composed of weathered rock, loose sand, silt and the like. Layer 2 is a shale layer. Layer 3 is a sandstone layer. Layers 4, 6, and 9 are shale layers. Layers 7 and 10 are limestone. Layers 5, 8, and 11 are sandstone layers. Layer 12 is the basement igneous complex. It is to be understood that the section described is diagrammatic and that many more layers are generally present in a geological cross section. The beds shown are ample to illustrate our invention. The position of a petroleum accumulation is shown at 13, which lies below the crest of the structure in a sandstone layer. Sandstones are frequently reservoirs for petroleum, as are porous spots in limestone and other rocks. Because of the relative density of petroleum and water, petroleum will lie in the highest stratigraphic position possible in its reservoir bed. It will be obvious that the average velocity over any stratigraphic thickness will also be higher for a position directly over the crest of the structures shown than the average velocity over a corresponding stratigraphic thickness positioned off the structural high.

In practicing our method, a small bore hole 14 through the weathered layer is usually provided so that the shotpoint E may be below the weathered layer. The velocity of seismic waves through the weathered layer will vary more from place to place than the velocity of seismic waves through the more consolidated portions of the earth's crust.

Upon the detonation of the charge of explosive, the seismic waves will emanate from point E in all directions following a multiplicity of paths. For the sake of simplicity, we have restricted our drawings to a showing of paths useful in our invention and as reflected from layer 7. It is to be understood, of course, that reflections will be had from each of the layers and these are used in obtaining the curves shown in Figure 4.

Figure 3:
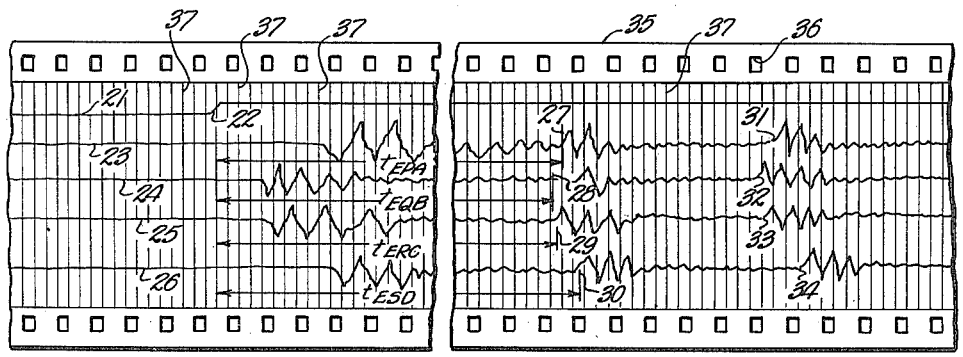
Figure 3 is a view showing the typical features of a seismogram obtained by practicing our method with the arrangement shown in Figure 1, with a part of the seismogram showing intermediate arrivals broken away.

A portion of the sound travels through layers 2, 3, 4, 5, and 6 until it comes in contact with layer 7 at point P. The physical change occurring at the interface between layers 6 and 7 causes a portion of the sound to be reflected at P, after which it passes upwardly through layers 6, 5, 4, 3, 2, and 1 to the seismometer positioned at point A. Similar sound paths are EQB, ERC, and ESD. The seismometers A, B, C, and D are of the type in which mechanical energy is changed into electric current, which is amplified and recorded at a recording assembly 15, either upon a common record strip or a plurality of record strips in a manner and by means well known to the art. The electrical energy from seismometer A is transmitted to the recorder 15 by conductors 16 and 17. The energy from seismometer B is transmitted to the recorder through conductors 18. The energy from seismometer C is transmitted to the recorder 15 through conductors 19 and the electric energy from seismometer D is transmitted to the recorder 15 through conductors 20. The recording assembly provides well known means for recording the time of origin of the sound waves and the reflections received at the seismometers A, B, C, and D. A typical seismogram is shown in Figure 3, in which trace 21 is made to give the time of origin of the sound. The instant that the bridge wire of an electric detonator used to detonate the charge of explosive at E breaks, it appears upon trace 21 at point 22. Trace 23 is the trace of arrivals at seismometer A. Trace 24 is the trace of arrivals at seismometer B. Trace 25 shows the arrivals at seismometer C and trace 26 shows the arrivals at seismometer D. Point 27 upon trace 23 is the arrival at seismogram A of reflection from point P. Point 28 is the arrival on trace 24 at seismometer B of the reflection from point Q. Point 29 is the arrival on trace 25 at seismometer C of the reflection from point R. Point 30 is the arrival at seismometer D of the reflection from point S in Figure 1. Points 31, 32, 33, and 34 are corresponding arrivals from layer 8. The seismogram consists of a strip 35 of sensitized film or paper provided with perforations 36 enabling it to be moved at a predetermined speed past an oscillograph adapted to reflect a beam of light upon the sensitized paper to form the traces heretofore described. Suitable means are provided for placing time lines 37 upon the seismogram. The time lines may be $\frac{1}{100}$ of a second apart so that the time elapsing between the origin of the seismic wave and its arrival may be accurately measured to at least $\frac{1}{1000}$ of a second. The time required for a seismic wave to traverse path EPA is shown in Figure 3 as $t_{EPA}$. The time elapsing for a seismic wave to traverse the path EQB is shown in Figure 3 as $t_{EQB}$. The time elapsing for a seismic wave to traverse path ERC in Figure 1 is shown in Figure 3 as $t_{ERC}$. The time required for a seismic wave to traverse the path ESD in Figure 1 is shown in Figure 3 as $t_{ESD}$.

Figure 2:
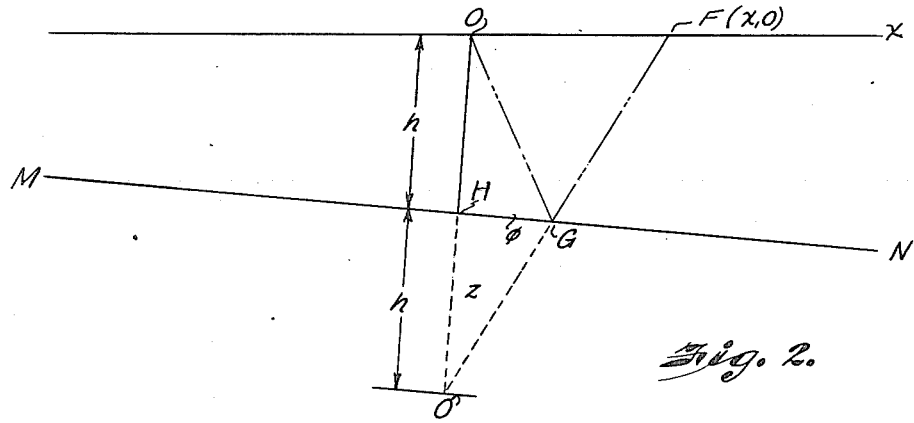
Figure 2 is a simplified diagram explanatory of the mathematical equations used in explaining our method.

Referring now to Figure 2, the origin of a rectangular coordinate system O is chosen coincident with the source of sound E in Figure 1. The $Ox$ axis is chosen in the general direction of maximum dip. The $z$ axis is chosen vertically downward. The $y$ axis does not enter into this simple example and it will be obvious to those skilled in the art that the equations hereinafter developed can be extended easily to cover three dimensional cases.

The line MN represents the trace of a boundary between two geological beds, as for example the boundary between beds 6 and 7 in Figure 1, it being understood that the two beds are of different physical properties so that the boundary constitutes a reflecting surface for sound. The angle of dip of MN with respect to the $Ox$ axis is shown as the angle $\phi$. A seismometer is presumed to occupy point F, having coordinates $(x, o)$. It is a well known principle in optics, which is true, too, in sound reflections, that when a reflection of energy occurs, the energy from the source travels the same length of path as though it had come from the image of the source in the reflecting plane. Referring to Figure 2, the actual path OGF is the path of a seismic wave from the point of origin O to the point of reflection G to the seismometer F. The image of point O is shown at O'. The line O'GF is obviously equal in length to the path OGF, since GH is common and $OG=O'G$. The sides of the triangle OO'F are related according to the law of cosines as, $$\overline{O'F}^2 = x^2 + 4h^2 + 4hx \sin \phi \quad (1)$$

But the length of path O'F is given by $$O'F = Vt \quad (2)$$

where V is the effective velocity of the material through which the sound has traveled and $t$ is the time of travel. Elimination of O'F between (1) and (2) gives, $$V^2 t^2 = x^2 + 4h^2 + 4hx \sin \phi \quad (3)$$

We now wish to apply Equation 3 to the sound paths shown in Figure 1, the times of arrivals of which are shown in Figure 3. Since we are not interested in the dip of the geological markers in our method we wish to eliminate its effect. If the horizontal distance from the seismometer located at A to the shotpoint E is chosen numerically equal to the horizontal distance between E and the seismometer at D and we call this distance $p$, we may apply Equation 3 as follows:

For the sound path ESD, $$V^2 t^2_{ESD} = p^2 + 4h^2 + 4hp \sin \phi \quad (4)$$

A similar equation for the path EPA is, $$V^2 t^2_{EPA} = p^2 + 4h^2 - 4hp \sin \phi \quad (5)$$

Adding Equations 4 and 5 gives, $$\frac{V^2(t^2_{ESD} + t^2_{EPA})}{2} = p^2 + 4h^2 \quad (6)$$

We have thus effectually eliminated the effect of dip. If we set $\phi = 0$ in Equation 3 we obtain, $$V^2 t^2 = x^2 + 4h^2 \quad (7)$$

which is very similar to what we obtained in Equation 6.

If the horizontal distance between the seismometer at B and the source of sound at E is equal to the horizontal distance between E and the seismometer at C, and this mutual distance is $q$ we may write, $$\frac{V^2(t^2_{EQB} + t^2_{ERC})}{2} = q^2 + 4h^2 \quad (8)$$

Elimination of $h$ between Equations 6 and 8 and solving for $V^2$ gives, $$V^2 = \frac{2(p^2 - q^2)}{(t^2_{ESD} + t^2_{EPA}) - (t^2_{EQB} + t^2_{ERC})} \quad (9)$$

It will be seen that, by placing seismometers B and C on opposite sides of the shotpoint and equidistant therefrom and by placing seismometers A and D on opposite sides of the shotpoint and equidistant therefrom that we are able, by means of Equation 9 to easily calculate the mean effective velocity through the vertical section under the shotpoint. It is obvious from Equation 9 that the accuracy of the calculated velocity is greater when the distance $p$ is large in comparison with $q$ because larger significant time values are used in comparison to normal errors in observed times. Most accurate results are obtained if line EBA forms an angle of 180 degrees with line ECD. It is to be understood that we have shown a simple arrangement in Figure 1. In practice, a plurality of seismometers may be placed along on each side of the shotpoint in pairs, each one of the pairs being equidistant from the shotpoint. Using the values for $t_{ESD}$, $t_{EQB}$, $t_{EPA}$ and $t_{ERC}$, the value of the mean effective velocity to bed 6 may be readily calculated from Equation 9. The other geological layers will also cause reflections which are recorded upon the record strip such as at points 31, 32, 33, 34. The mean effective velocities are calculated by use of Equation 9 to each of the various beds and plotted to give curve 40 shown in Figure 4 in which points $V_2$, $V_3$, $V_4$, $V_5$, $V_6$, $V_7$, $V_8$, $V_9$, $V_{10}$, $V_{11}$ and $V_{12}$ are the mean effective velocities calculated from Equation 9 from the various beds in Figure 1.

Figure 4:
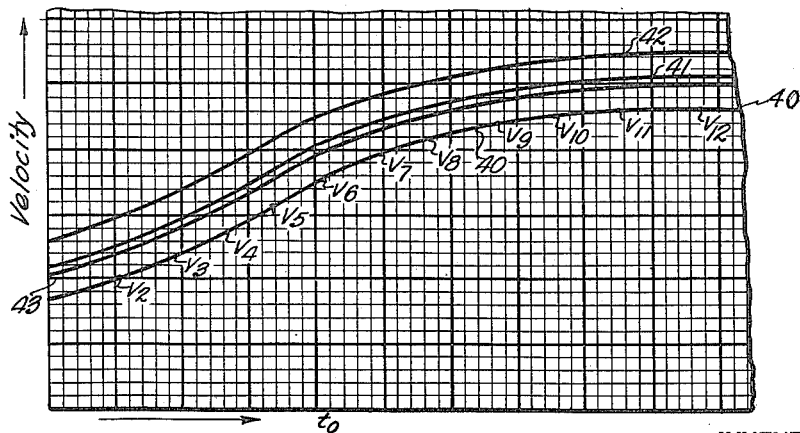
Figure 4 is a diagrammatic view illustrating changes of velocities with respect to time as found by applying our invention in the area shown in Figure 1.

It will be observed that the curve shown in Figure 4 is obtained by plotting velocity against time of travel, $t_o$. In plotting point times for example, the velocity is calculated from Equation 9. Since the curves are relative, the value for $t_o$ for any velocity calculation may be taken as the time of arrival at a seismometer located close to the shotpoint, as for example, seismometer B.

From the foregoing, it will be clear that the curve 40 is a curve of mean effective velocities at point E in Fig. 1. The set-up is repeated at point F and a second record is made from which curve 41 is obtained. Since point F is closer to the crest of the formation, the mean effective velocities will be greater and this will be apparent from Figure 4. The set-up is then advanced a further distance to point G and a record taken from which curve 42 is obtained. The set-up is then advanced to a point H, the entire shot made and another record taken and a curve 43 is obtained. It will be observed that, as soon as the crest of the formation is passed, that the mean effective velocity curves will show lower average velocities indicating that the older and more consolidated strata are deeper buried so that the seismic energy must pass through a greater distance of less consolidated or younger formations having slower seismic wave transferring qualities.

A plurality of observations may be taken upon a line having a given asimuth establishing a high point of a buried formation at a given point along said line. Observations may then be taken from points adjacent the high point along lines passing through the high point previously found. If the high points or the points of greatest mean effective velocity coincide, we then know the high point or the crest of the structure.

After an area is surveyed by means of our novel method, a contour map such as shown in Figure 5 can be drawn. The numerals adjacent the circles indicating shot holes indicate the velocities determine at the location of the shot hole. A contour map can then be drawn showing the distribution of subsurface velocities. This contour map will be a fair representation of buried structure.

It will be observed that we have accomplished the objects of our invention. When using a plurality of seismometers stationed between points A and B, and C and D in Figure 1, we obtain a surplus of observations and the solution for the excess case may be obtained by an application of the method of least squares and other well known mathematical principles. In the description of our invention, we have restricted ourselves to a simple case using an instrumental arrangement having a single source of sound and a plurality of seismometers set preferably along a straight line. We may, if we desire, use one seismometer with a plurality of sound sources in which the sound sources are set off in succession. For example, the seismometer may be located at point E and sound sources located at points A, B, C, and D, respectively. We may place seismometers along a line at an angle to the line ABCD in order to obtain three dimensional observations. It will also be observed that the relative spacing of velocity curves 40, 41, 42, and 43 will give an indication of the slope of the buried formation. If at two successive points, as for example, E and F, the resulting curves 40 and 41 are closer positioned in Figure 4, we know that the dip of the formation or subsurface gradient is small. If, on the other hand, the spacing between adjacent curves varies sharply, we know that the dip is great.

It will also be observed that our method eliminates the disadvantages of reflection methods in areas in which velocity values are altered by subsurface anomalies. The refraction methods are difficult of application where the subsurface formation being investigated is deeply buried and where the dip or inclination of the subsurface formation is small. Refraction methods are most effective in the investigation of domes. Reflection methods tend to be inaccurate in the region of domes due to variations in velocity introduced by the domal structure. Our method obviates the disadvantages of both prior methods and utilizes the advantages of both.

We wish to emphasize that our method is not limited to a particular mode of determining velocities by reflection shooting. It is the application of the conception that velocity determinations may be used as a mode or new method of making geophysical explorations. Any suitable manner of determining velocity from reflected seismic waves may be used in carrying out our invention. The above described methods of carrying out our invention are given by way of illustration and not by way of limitation.

It will be understood that certain features and subcombinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, we claim:

1. A method of profiling tectonic structure including the steps of generating seismic waves at a point near the earth's surface, recording the time of travel of reflected waves from the generating point to the subsurface strata and back to a plurality of points on the surface located at a predetermined distance from the generating point, computing the velocity of travel vertically at the generating point of the reflected seismic waves from the recorded data at the plurality of receiving points.

2. A method of profiling tectonic structure including the steps of generating seismic waves at a plurality of points near the earth's surface, recording the time of travel of reflected waves from the generating points to the subsurface strata and back to a plurality of points on the surface located at predetermined distances from the generating points, computing the velocity of travel vertically at the generating point of the reflected seismic waves from the data at the plurality of receiving points and plotting the contour of the subsurface structure from the velocities of travel computed at the different generating points.

3. A method of profiling tectonic structure including the steps of generating seismic waves at a point near the earth's surface, recording the time of travel of reflected waves from the generating point to the subsurface strata and back to a plurality of points on the surface located at predetermined distances from the generating point, computing the velocity of travel vertically at the generating point of the reflected seismic waves, repeating said steps at a plurality of generating points over the area being investigated, plotting velocities of travel of the seismic waves at the various generating points and drawing a contour map from the plotted points indicating the position and extent of the subsurface structure.

4. A method of profiling tectonic structure including the steps of generating seismic waves at a point near the earth's surface, recording the time of travel of reflected waves from the generating point to the subsurface strata and back to a plurality of points on the surface located at predetermined distances from the generating point, computing the mean effective velocity of travel vertically at the generating point of the reflected seismic waves, repeating said steps at a plurality of generating points over the area being investigated, plotting velocities of travel of the seismic waves at the various generating points and drawing a contour map from the plotted points indicating the position and extent of the subsurface structure.

5. An arrangement pattern for the location of points for generating seismic waves and for the reception of seismic waves in a geophysical exploring method which provides a record of the mean effective velocities of reflected seismic wave travel at a plurality of generating points comprising a wave generating point, two pairs of reception stations disposed on opposite sides of the seismic wave generating point, the interpoint distance of the reception stations on one side of the wave generating point being equal to the interpoint distance of the other pair of reception stations.

6. An arrangement pattern for the location of points for generating seismic waves and for the reception of seismic waves in a geophysical exploring method which provides a record of the mean effective velocities of reflected seismic wave travel at a plurality of generating points comprising a wave generating point, two pairs of seismic stations disposed on opposite sides of the seismic wave generating point, said respective pairs being equidistant from and on opposite sides of said generating point, the distance from the generating point to one receiving station of the pair being different from the distance of the receiving station of the other pair to said generating point.

7. An arrangement pattern for the location of points for generating seismic waves and for the reception of seismic waves in a geophysical exploring method which provides a record of the mean effective velocities of reflected seismic wave travel at a plurality of generating points comprising a wave generating point, two pairs of seismic reception stations disposed on opposite sides of the seismic wave generating point, one receiver of each pair being disposed relatively close to the generating point and the other receiver of each pair being disposed relatively remote from the generating point.

LAWRENCE F. ATHY.
ELTON V. McCOLLUM.